United States Patent
Guntoro et al.

(10) Patent No.: US 11,599,787 B2
(45) Date of Patent: Mar. 7, 2023

(54) MODEL CALCULATION UNIT AND CONTROL DEVICE FOR CALCULATING A MULTI-LAYER PERCEPTRON MODEL

(71) Applicant: Robert Bosch GmbH, Stuttgart (DE)

(72) Inventors: Andre Guntoro, Weil der Stadt (DE); Heiner Markert, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 926 days.

(21) Appl. No.: 16/330,906

(22) PCT Filed: Sep. 4, 2017

(86) PCT No.: PCT/EP2017/072046
§ 371 (c)(1),
(2) Date: Mar. 6, 2019

(87) PCT Pub. No.: WO2018/046418
PCT Pub. Date: Mar. 15, 2018

(65) Prior Publication Data
US 2019/0197405 A1    Jun. 27, 2019

(30) Foreign Application Priority Data

Sep. 7, 2016 (DE) .................... 10 2016 216 947.5

(51) Int. Cl.
G06N 3/08 (2023.01)
G06N 3/063 (2023.01)
G06N 3/04 (2023.01)

(52) U.S. Cl.
CPC .............. G06N 3/08 (2013.01); G06N 3/04 (2013.01); G06N 3/063 (2013.01)

(58) Field of Classification Search
CPC ............. G06N 3/08; G06N 3/04; G06N 3/063
See application file for complete search history.

(56) References Cited

U.S. PATENT DOCUMENTS 5,583,964 A    12/1996 Wang
2008/0016014 A1    1/2008 Sigal et al.
(Continued)

FOREIGN PATENT DOCUMENTS

DE    29521338 U1    3/1997
JP    H03235723 A    10/1991
(Continued)

OTHER PUBLICATIONS

Qui, "Going Deeper with Embedded FPGA Platform for Convolutional Neural Network", FPGA' 16, Feb. 21-23, 2016, ACM (Year: 2016).*

(Continued)

*Primary Examiner* — Li B. Zhen
*Assistant Examiner* — Moriam Mosunmola Godo
(74) *Attorney, Agent, or Firm* — Norton Rose Fulbright US LLP; Gerard Messina

(57) ABSTRACT

A hardware-implemented multi-layer perceptron model calculation unit includes: a processor core to calculate output quantities of a neuron layer based on input quantities of an input vector; a memory that has, for each neuron layer, a respective configuration segment for storing configuration parameters and a respective data storage segment for storing the input quantities of the input vector and the one or more output quantities; and a DMA unit to successively instruct the processor core to: calculate respective neuron layers based on the configuration parameters of each configuration segment, calculate input quantities of the input vector defined thereby, and store respectively resulting output quantities in a data storage segment defined by the corre- (Continued)

sponding configuration parameters, the configuration parameters of configuration segments successively taken into account indicating a data storage region for the resulting output quantities corresponding to the data storage region for the input quantities for a subsequent neuron layer.

9 Claims, 6 Drawing Sheets

(56) References Cited

U.S. PATENT DOCUMENTS

| | | | | |
|---|---|---|---|---|
| 2015/0012575 | A1* | 1/2015 | Markert | G06F 9/3877 708/105 |
| 2015/0199963 | A1* | 7/2015 | Maaninen | G10L 15/16 704/232 |

FOREIGN PATENT DOCUMENTS

| | | |
|---|---|---|
| JP | H06175999 A | 6/1994 |
| JP | 2001034735 A | 2/2001 |
| JP | 2015015024 A | 1/2015 |
| KR | 20140122672 A | 10/2014 |
| WO | 2016099779 A1 | 6/2016 |

OTHER PUBLICATIONS

International Search Report dated Dec. 12, 2017 of the corresponding International Application PCT/EP2017/072046 filed Sep. 4, 2017.
Eppler W et al: "High speed neural network chip for trigger purposes in high energy physics", Design, Automation and Test in Europe, 1998., Proceedings Paris, France Feb. 23-26, 1998, Los Alamitos, CA, USA, IEEE Comput. Soc, US, Feb. 21, 1998 (Feb. 23, 1998), pp. 108-115, XP010268412, DOI: 10.1109/DATE.1998.655844 ISBN: 978-0-8186-8359-6 p. 108-p. 115, left-hand col., paragraph 1.
Richard Fiifi Turkson et al.: "Artificial neural network applications in the calibration of spark-ignition engines: An overview", Engineering Science and Technology, an International Journal, vol. 19, No. 3, Apr. 16, 2016 (Apr. 16, 2016), pp. 1346-1359, XP055420859, ISSN: 2215-0986, DOI: 10.1016/j.jestch.2016.03.003 p. 1346-p. 1357, left-hand col., paragraph 2.
Keuntak Yang et al.: "A Multi-Layer Perceptron SoC for Smart Devices", Computer Science and Engineering, vol. 2, No. 7, Jan. 7, 2013 (Jan. 7, 2013), pp. 133-137, XP055303611, ISSN: 2163-1484, DOI: 10.5923/j.computer.20120207.02 p. 133-p. 136.
Tianshi Chen et al: "DianNao", Architectural Support for Programming Languages and Operating Systems, ACM, 2 Penn Plaza, Suite 701 New York NY 10121-0701 USA, Feb. 24, 2014 (Feb. 24, 2014), pp. 269-284, XP058044553, DOI: 10.1145/2541940.2541967 ISBN: 978-1-4503-2305-5 p. 271, right-hand col., last paragraph—p. 281, right-hand col. paragraph 1 Abschnitt 5.2.2-5.3.2.

* cited by examiner

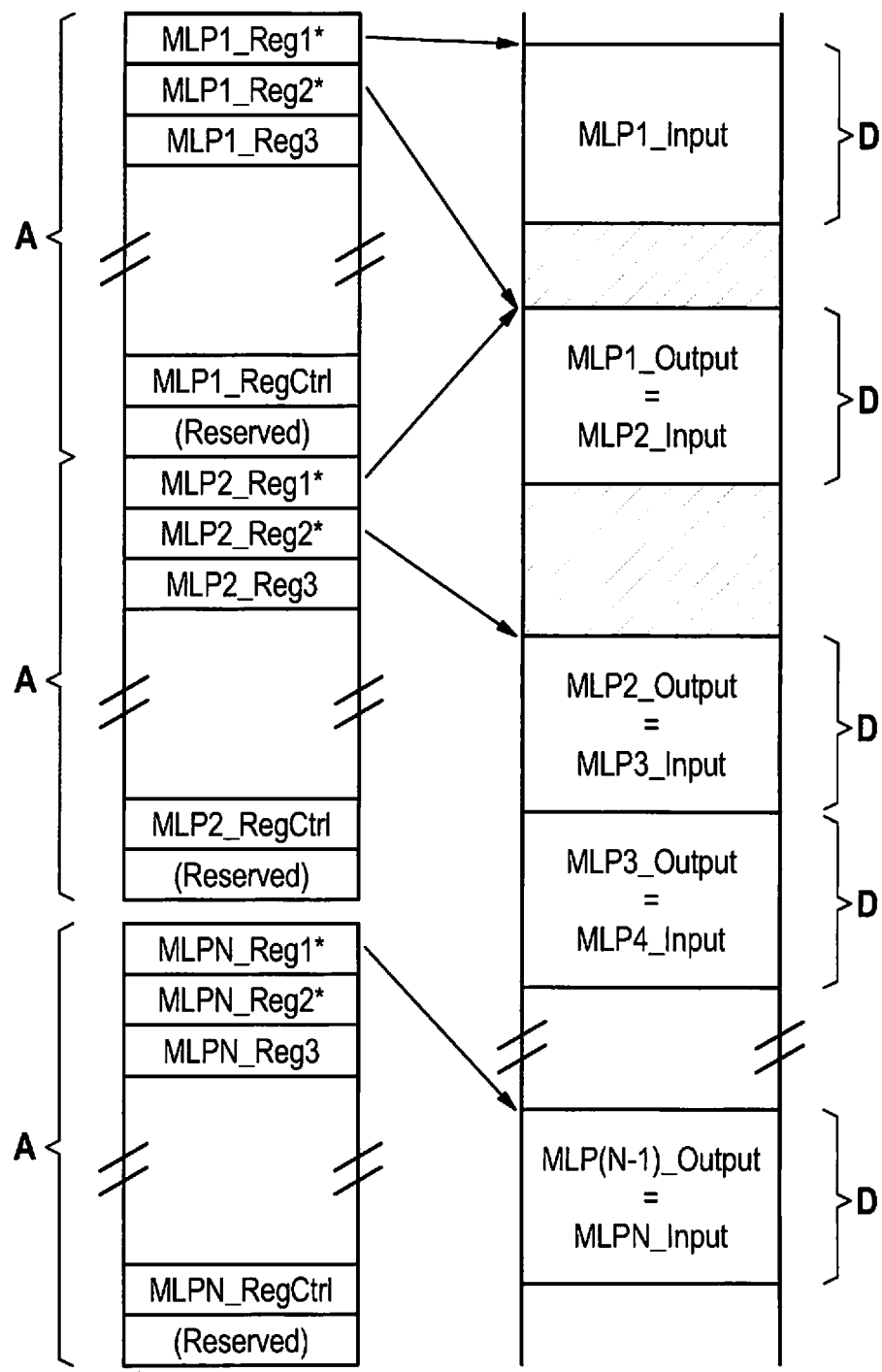

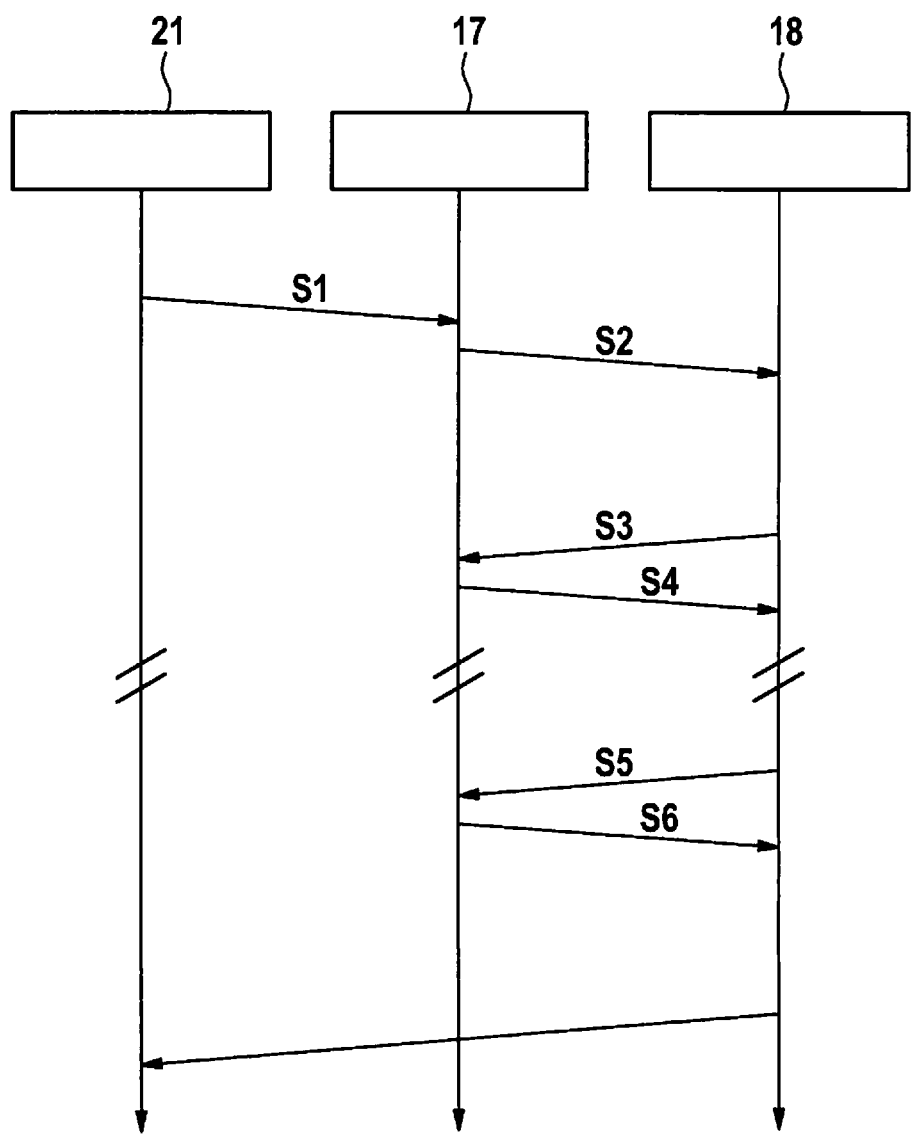

MODEL CALCULATION UNIT AND CONTROL DEVICE FOR CALCULATING A MULTI-LAYER PERCEPTRON MODEL

CROSS-REFERENCE TO RELATED APPLICATIONS

The present application is the national stage of International Pat. App. No. PCT/EP2017/072046 filed Sep. 4, 2017, and claims priority under 35 U.S.C. § 119 to DE 10 2016 216 947.5, filed in the Federal Republic of Germany on Sep. 7, 2016, the content of each of which are incorporated herein by reference in their entireties.

FIELD OF THE INVENTION

The present invention relates to calculation of functional models in a separate hardwired model calculation unit, in particular for calculating multilayer perceptron models.

BACKGROUND

Functions of control units of technical systems, such as internal combustion engines, electric drives, battery storage devices, and the like, are frequently realized by models that represent a mathematical mapping of the real system. However, physical models, in particular given complex relationships, lack the required calculation precision, and, given today's computing capacities, as a rule it is difficult to calculate such models within the real-time requirements necessary for control devices. For such cases, an approach is to use data-based models that describes relations between an output quantity and input quantities exclusively on the basis of training data obtained using a test bench or the like.

In particular, data-based models are suitable for modeling complex relationships in which a plurality of input quantities between which reciprocal relationships exist are taken into account in a suitable manner in the model. In addition, modeling using data-based models offers the possibility of supplementing the model by adding individual input quantities.

Data-based functional models are as a rule based on a large number of support points in order to achieve a degree of modeling precision adequate for the respective application. Due to the large number of support points, a high computing capacity is required for the calculation of a model value with a data-based functional model, such as a Gauss process model or a multi-layer perceptron model. In order to enable calculation of such a data-based functional model in real time in a control device application, model calculation units based on a hardware realization can therefore be provided.

SUMMARY

Example embodiments of the present invention are directed to a model calculation unit for calculating a neuron layer of a multi-layer perceptron model, to a control device, and to a use of the control device.

According to a first aspect, a model calculation unit for calculating a multi-layer perceptron model is realized in hardware, is hardwired, and includes: a processor core that is designed to calculate one or more output quantities of a neuron layer of a multi-layer perceptron model having a number of neurons as a function of one or more input quantities of an input quantity vector; a memory device that has, for each neuron layer, a configuration memory region for storing configuration parameters and a respective configuration memory segment and a data storage region for storing the input quantities of the input quantity vector and the one or more output quantities in a respective memory segment; and a DMA unit that is designed to successively instruct the processor core to calculate a respective neuron layer based on the configuration parameters of each configuration memory segment, to calculate the input quantities defined thereby of the input quantity vector, and to store the respectively resulting output quantities in a data storage segment, defined by the corresponding configuration parameters, of the data storage region, where the configuration parameters of configuration memory segments are successively taken into account indicating a data storage region for the resulting output quantities that corresponds to the data storage region for the input quantities for the calculation of the subsequent neuron layer.

The above model calculation unit provides an embodiment that makes it possible to calculate a plurality of neuron layers of a multi-layer perceptron model (MLP model) as part of a data-based model, having a variable number of neurons in each case. The use of multi-layer perceptron models is a data-based modeling having a lower number of support points than comparable data-based models such as a Gauss process model.

An idea of the above model calculation unit is to design this unit for the calculation of a layer of a multi-layer perceptron model in hardware structures separately in a processor core in a control device. In this way, a substantially hardwired hardware circuit can be provided for the realization of functions that makes it possible to calculate one or more layers of a multi-layer perceptron model while bringing about only a very low computing load in a software-controlled microprocessor of a control device. Through the hardware acceleration provided by the model calculation unit, a multi-layer perceptron model can be calculated in real time, so that the use of such a model becomes a possibility to be considered for control device applications for internal combustion engines in motor vehicles.

The above model calculation unit realized in hardware enables an automatic calculation, taking place successively, of a plurality of neuron layers of a multi-layer perceptron model in a processor core in a control device. By outsourcing a calculation of a multi-layer perceptron model to a model calculation unit that is hardwired, it is possible to reduce to the greatest possible extent the communication between a microprocessor and the model calculation unit for calculating a multi-layer perceptron model, and in this way to minimize the time outlay for the calculation of a model value.

In the calculation of a model value for a multi-layer perceptron model, as a rule layer-by-layer calculations are carried out, an input quantity of an input quantity vector being supplied to a first neuron layer, and, through the calculation of the first neuron layer, intermediate output quantities of an intermediate output quantity vector being obtained that in turn are used as intermediate input quantities for a subsequent neuron layer of the perceptron model.

Corresponding to the number of neuron layers of the perceptron model, these calculations are carried out one after the other in order to obtain the model value as the result of a final neuron layer. For this purpose, a memory structure is provided that can carry out a controlling of the calculation sequence together with a DMA unit.

Through the provision of a data storage region having respective segments for storing input quantities of the input quantity vector and intermediate input quantities of an intermediate input quantity vector for further following neuron layers, an automatic calculation of the model value can be provided in the model calculation unit without a further copying process. This is done in such a way that the output quantities of the output quantity vectors of each neuron layer, except for the last neuron layer, are each stored in the segment of the data storage region for storing the intermediate input quantities of the respective next neuron layer to be calculated. Through renewed activation of the calculation of a corresponding neuron layer in the processor core by the DMA unit, in this way a specified number of neuron layers of the multi-layer perceptron model can be automatically calculated.

In particular, a configuration memory region can be provided that configures the sequence of the calculation and makes it possible to parameterize a number of neuron layers and a specifiable number of neurons for each neuron layer, and to determine their calculation sequence. In addition, the processor core provides the addressing of a data storage region, from which input quantities of an input quantity vector are read and output quantities of an output quantity vector of a neuron layer are written, in such a way that output quantities of a calculation of neuron layer are redefined as intermediate input quantities for a subsequent neuron layer. In this way, through the automatic starting of a renewed calculation of a neuron layer, a sequence of a multi-layer calculation of the perceptron model can be provided through a suitable parameterization in the configuration memory region of the memory of the processor core. In this way, it is possible to specify to a processor core a task for the calculation of a multi-layer perceptron model by a microprocessor, and, without further interventions by the microprocessor, to call, or to receive, a model value as output value of the multi-layer perceptron model from the microprocessor after the termination of the calculation.

In addition, it can be provided that the DMA unit is designed to provide, after termination of the calculation of the neuron layer, the configuration parameters for the next neuron layer to the processor core, the calculation being terminated as a function of one or more configuration parameters.

According to a example embodiment, the processor core is designed to signal the end of the current calculation of the neuron layer to the DMA unit, the DMA unit starting the calculation of the next neuron layer based on configuration parameters stored in a further configuration memory segment.

In addition, the processor core can be designed to calculate, for a neuron layer of a multi-layer perceptron model having a number of neurons, an output quantity for each neuron as a function of one or more input quantities of an input quantity vector, a weighting matrix having weighting factors, and an offset value specified for each neuron, where for each neuron the offset value specified for the neuron is applied to a sum of the values of the input quantities, each weighted with a weighting factor, and the result is transformed with an activation function in order to obtain the output quantity for the neuron, the weighting factor being defined or determined by the neuron and the input quantity.

According to an example embodiment, the processor is fashioned in a surface area of an integrated module.

According to another aspect, a control device includes a microprocessor and one or more of the above model calculation units, the control device being designed in particular as an integrated circuit.

According to another aspect, the above control device is used for controlling an engine system having an internal combustion engine and/or having an electric drive and/or an electrical energy storage device in a motor vehicle. In the following, example embodiments are explained in more detail on the basis of the accompanying drawings.

BRIEF DESCRIPTION OF THE DRAWINGS

FIGS. 6a and 6b show a partitioning of a configuration memory region and of a data storage region, according to an example embodiment of the present invention.

FIG. 7 shows a flow sequence diagram showing the function of the DMA unit of the model calculation unit, according to an example embodiment of the present invention.

DETAILED DESCRIPTION

Figure 1:
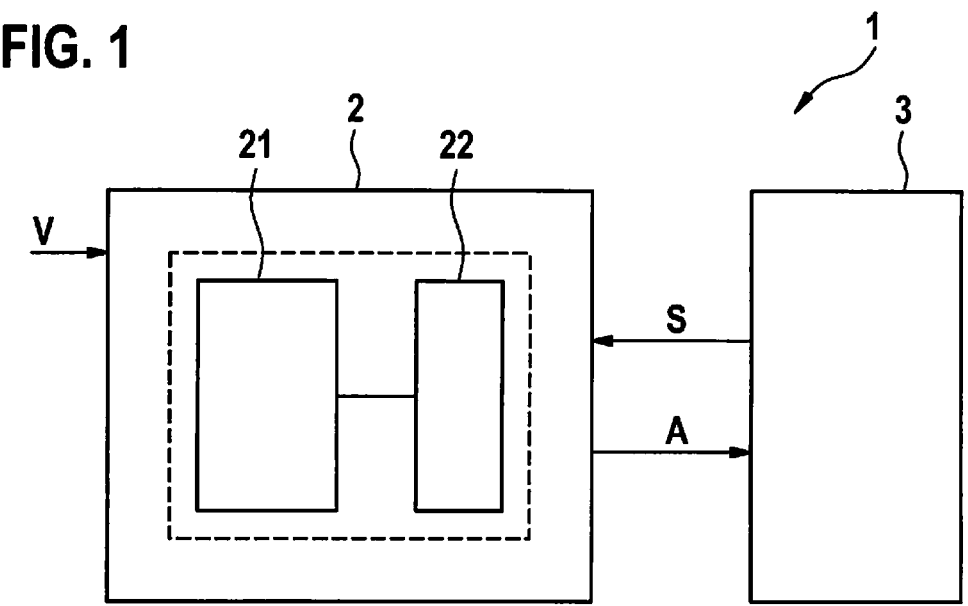
FIG. 1 shows a schematic representation of a control device for use for an engine system in a motor vehicle, according to an example embodiment of the present invention.

FIG. 1 shows, as an example, a schematic representation of a control device 2 for an engine system 1 having an internal combustion engine 3 as an example of a technical system to be controlled. Control device 2 includes a microprocessor 21 and a model calculation unit 22, which can be realized as separate components or in integrated fashion in separate surface areas on a chip. In particular, model calculation unit 22 is a hardware circuit that can be structurally separate from a processor core of microprocessor 21.

Model calculation unit 22 is substantially hardwired, and correspondingly is not designed, as microprocessor 21 is, to execute software code and thereby to carry out a variable function specified by software. In other words, in model calculation unit 22 a processor operated by a software code is not provided. The focus on a specified modeling function enables a resource-optimized realization of such a model calculation unit. In an integrated design, model calculation unit 22 can be realized so as to be optimized with regard to surface, which furthermore enables fast calculations.

Control device 2 is substantially used to process sensor signals S, or sensor quantities acquired by a sensor system in internal combustion engine 3, and/or external specifications V, and to apply values of one or more corresponding control quantities A to internal combustion engine 3 cyclically in fixedly specified time intervals of, e.g., 1-100 ms, or in angularly synchronous fashion as a function of a crankshaft angle of an operated internal combustion engine, so that the engine can be operated in a known manner.

Figure 2:
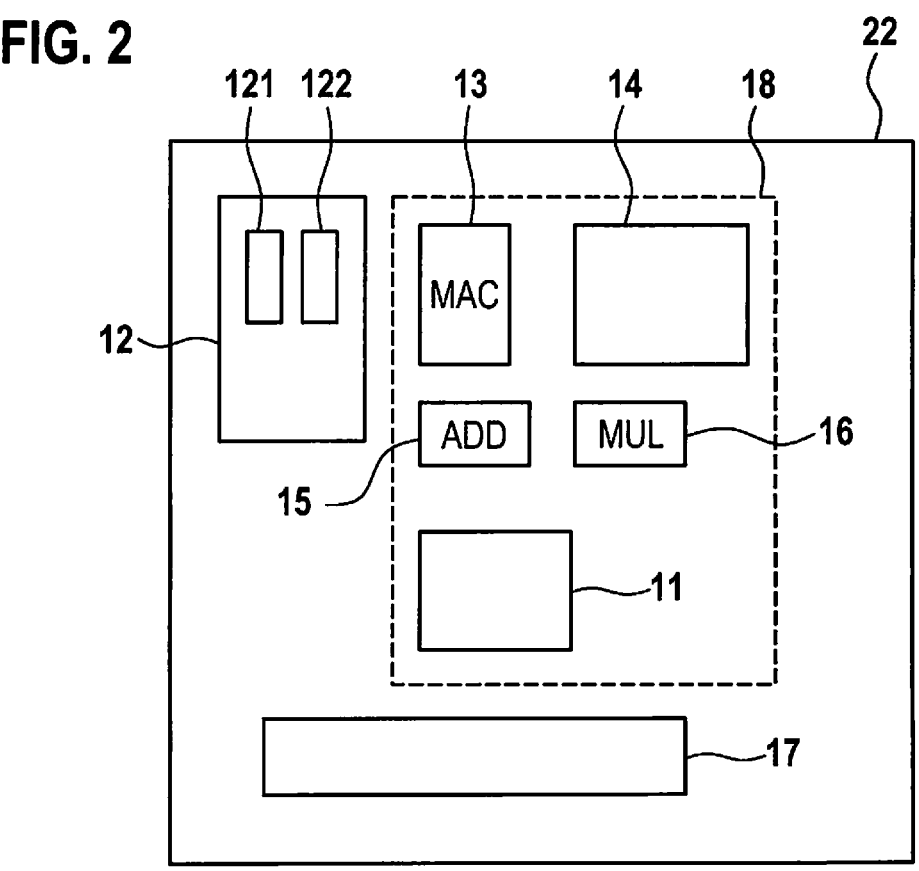
FIG. 2 shows a schematic representation of a calculating unit as part of the control device, according to an example embodiment of the present invention.

FIG. 2 shows a model calculation unit 22 in more detail. Model calculation unit 22 includes a state machine 11, a memory 12, and one or more operation blocks, for example, one or more MAC blocks 13 (MAC: Multiply-ACcumulate for fixed-point calculation, or FNA: Fused-Multiply Add for floating-point calculation), and an activation function calculation block 14 for calculating an activation function, as well as, optionally, an addition block 15 and/or a multiplication block 16. Using state machine 11, values of input quantities stored in a data storage region 122 (input quantity memory region) in memory 12 can be calculated through repeated loop calculations in order to obtain intermediate quantities or output quantities that are written to a corresponding output quantity memory region of memory 12.

The controlling of the calculation can be carried out using a DMA unit 17 (DMA: Direct Memory Access).

State machine 11 is designed to calculate an individual neuron layer of a multi-layer perceptron model. State machine 11 can be described on the basis of the following pseudo-code:

```
/* Input transformation */
for (k=0; k<p7; k++)
{
    ut[k] = u[k]*p1[k] + p2[k]:
}
/* Loop calculation */
for (j=p8; j<p6; j++)
{
    i = j * P7;
    t = p3[j];
    for (k=0; k<p7; k++)
    {
        t += V[i+k] * ut[k];
    }
    y[j] = act(t);
}
/* Output transformation */
for (k=0; k<p6; k++)
{
    z[k] = y[k] * p4[k] + p5[k];
}
```

Where
p7: maximum index value for the input quantities of the input quantity vector;
p8: minimum index value or initial value for the calculation of the neurons of the current neuron layer;
p6: maximum index value for the neurons of the current neuron layer;
p3: offset value
p1, p2: variables for the input transformation
p4, p5: variables for the output transformation Using the above pseudo-code, the following calculation can be carried out for each neuron of the neuron layer to be calculated:

$$y[j] = \text{act}(p3[j] + \Sigma_{k=0}^{p7-1} v_{j,k} \cdot ut[k]) \text{ for } j=0 \ldots p6-1$$

Figure 3:
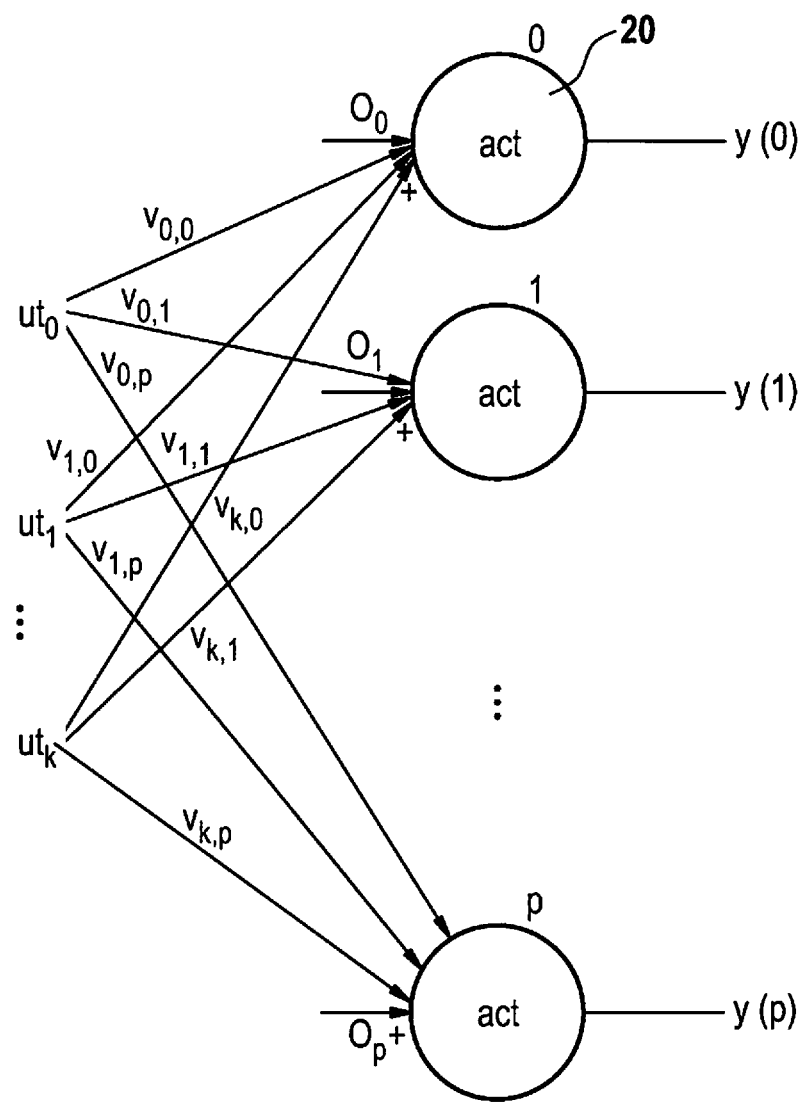
FIG. 3 shows a schematic representation of a neuron layer of an MLP model, according to an example embodiment of the present invention.
Figure 4A:
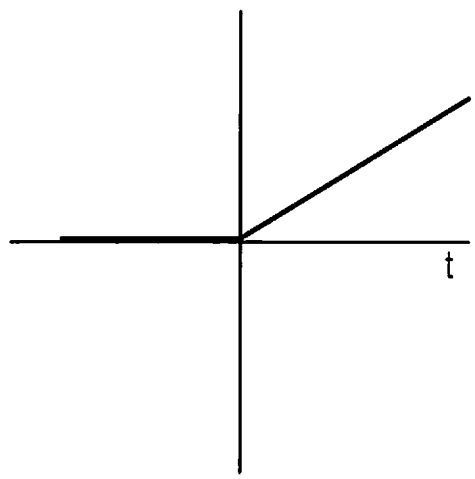
FIGS. 4a-4d show representations of possible activation functions, according to example embodiments of the present invention.
Figure 4B:
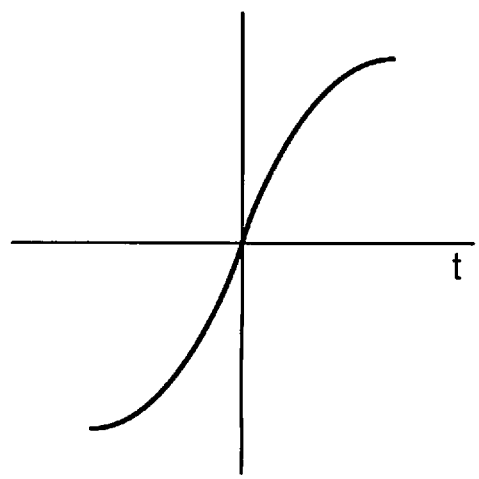
Figure 4C:
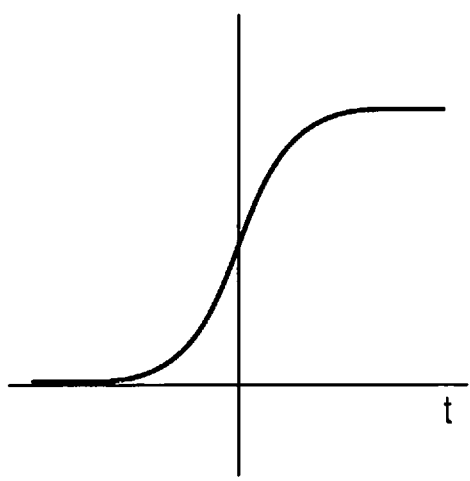
Figure 4D:
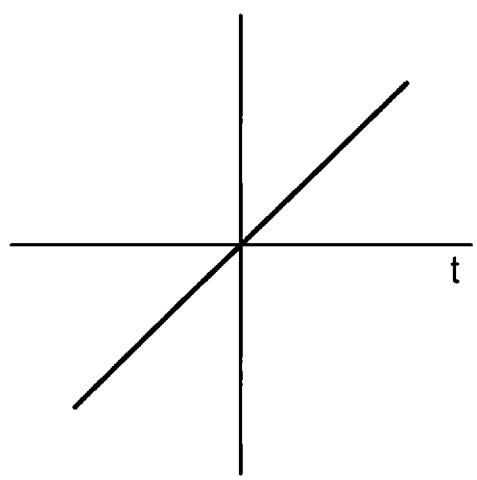

This is a calculation for a neuron layer of a multi-layer perceptron model, as shown in FIG. 3.

FIG. 3 shows a neuron layer of a plurality of neurons 20 to which values of input quantities of an input quantity vector $ut_0 \ldots ut_{p6-1}$ are supplied. The values of the input quantities are weighted using a corresponding specified weighting matrix of weighting factors $v_{0 \ldots p}7-1, 0 \ldots p6-1$. Usually, the weighting is done through multiplication by the assigned weighting factors $v_{0 \ldots p}7-1, 0 \ldots p6-1$. Generally, the weighting factors can also be applied to the values of the input quantity vector in other ways.

An offset value $O_0 \ldots O_{p6-1}$ is applied, in particular additively, to the result of the sum of the weighted values of the input quantity vector $ut_0 \ldots ut_{p6-1}$. The result is transformed using a specified activation function "act." As a result, a corresponding value of an output quantity vector $y_0 \ldots y_{p6-1}$ is obtained. Due to the provision of the offset value for each neuron, there is a further degree of freedom for the model formation.

The number of neurons 20 of the neuron layer to be calculated can be set by defining the running variables p6. By using the values of output quantity vector $y_0 \ldots y_{p6-1}$ of a neuron layer as input quantity vector, a multi-layer perceptron model can be used for a calculation of a subsequent neuron layer in model calculation unit 22, so that the number of neuron layers of the multi-layer perceptron model can be realized by repeated calling of the function according to the above pseudo-code, or through repeated calling of model calculation unit 22 with correspondingly changed parameters.

An input transformation and/or output transformation of the input quantities of the input quantity vector or of the output quantities of the output quantity vector can be carried out using norming variables p1 and p2, or p4 and p5, specified for each neuron. This input transformation and/or output transformation of the input quantities can also be skipped.

The layer-by-layer calculation of the MLP model enables a streamlined realization of model calculation unit 22, so that its surface area requirement in the integrated construction is low. Nonetheless, model calculation unit 22 enables a calculation of a multi-layer perceptron model in a simple manner, by feeding back or redefining the values of the output quantities of the output quantity vector as input quantities of an input quantity vector for the calculation of a further neuron layer.

As activation function "act," one of a plurality of activation functions can be made available that can be calculated by activation function calculation block 14 of model calculation unit 22. The activation functions can for example correspond to a bending function, a tangent-hyperbolic function, a sigmoid function, or a linear function, as shown correspondingly in FIGS. 4a-4d.

Through the one-layer realization of the neuron model realized by the above pseudo-code, it is in addition possible through simple modification to calculate, alongside a neuron layer of an MLP model, a Gauss process model or an RBF model (RBF: Radial Base Function) as well. For this purpose, the weighting values are not applied to the values of the input quantities by multiplication, but rather by addition or subtraction. In addition, the quadratic distance is calculated, weighted with specified length scales L[k]. In addition, for the RBF model, an exponential function is selected as activation function. In this way, a Gauss process model corresponding to:

$$y = \Sigma_{j=0}^{p6-1} p3[j] \cdot \exp(-\Sigma_{k=0}^{p7-1} L[k] \cdot (-v_{j,k} + ut[k])^2)$$

can optionally be calculated as follows through a modification of the pseudo-code:

```
/* Input transformation */
for (k=0; k<p7; K++)
{
    ut[k] = u[k]*p1[k] + p2[k]:
}
/* Loop calculation */
for (j=p8; j<p6; j++)
{
    i = j * P7;
    t = (cfg_mlp) ? p3[j] : 0.0f; // Offset values for calculating
        the perceptron model
    for (k=0; k<p7; k++)
    {
        if (cfg_mlp)
```

```
    {
      t += V[i+k] * ut[k];
    }
    else
    {
      d = V[i+k] − ut[k];
      d = d * d;
      t += L[k] * d'
    }
  }
  if (cfg_mlp)
  {
    switch (cfg_activation_function)
    {
    case 1:
      e = (t>0.0f) ? t : 0.0f; // bending function break;
    case 2: // sigmoid function
      e = tanh(t);
      break;
    default: // linear function
      e = t;
    }
    y[j] = e;
  }
  else // for Gauss process model / RBF model
  {
    e = exp(−t);
    y[0] += p3[j] * e;
  }
  /* Output transformation */
  j = (cfg_mlp) ? p6 : 1;
  for (k=0; k<j; k++)
  {
    z[k] = y[k] * p4[k] + p5[k];
  }
```

It will be seen that during the execution of the loop function, a case distinction can be carried out via the variable cfg_mlp. When cfg_mlp=1, the calculation of the neuron layer is selected, and with cfg_activation_function= 0 . . . 3 the type of the above-described activation functions can be selected.

When cfg_mlp=0, a Gauss process model or an RBF model is calculated. Here, a selection of the activation function is not necessary because this function is always calculated with the exponential function. In this way, it is possible to use model calculation unit 22 both for the calculation of Gauss process models and RBF models and also for the calculation of a neuron layer of an MLP model, while requiring only a small surface area in an integrated design of the state machine.

Memory 12 of model calculation unit 22 has a configuration memory region 121 that can store configuration parameters for a specified number of neuron layers in respective configuration memory segments A. Configuration memory region 121 can be part of a main memory of the control device that can be accessed or used both by microprocessor 21 and by model calculation unit 22. Alternatively, configuration memory segments A can also be provided in a separate flash memory or in a memory that is exclusive for processor core 18.

Figure 5:
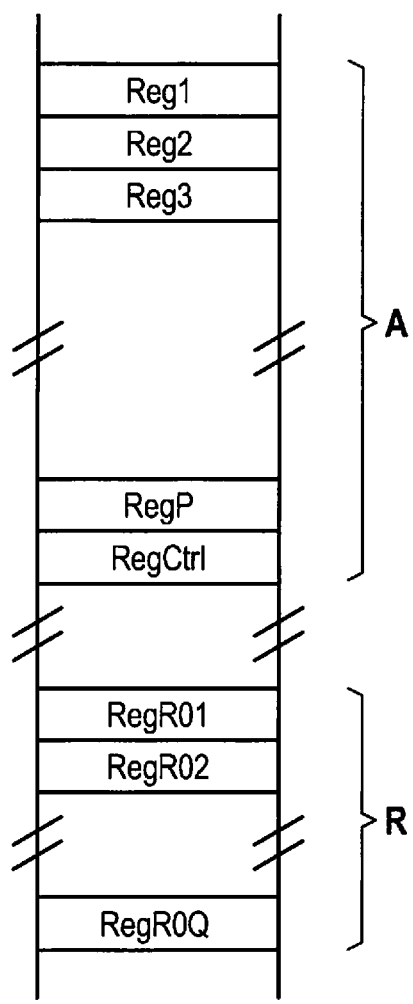
FIG. 5 shows a configuration memory segment of a configuration memory region of the processor core, according to an example embodiment of the present invention.

Configuration memory segments A have individual memory addresses in which the configuration parameters of model calculation unit 22 are stored corresponding to a specified sequence, as shown as an example in FIG. 5. For the use of the individual configuration memory segments A, the values stored there for the calculation of a neuron layer are copied to registers of processor core 18 provided for this purpose, with the aid of DMA unit 17. The copying process can take place without involvement of the microcontroller or of the processor core 18, but rather automatically by DMA unit 17.

Address positions Reg1 through RegP of the respective configuration memory segment A include parameters for carrying out a calculation in the relevant neuron layer to which configuration memory segment A of configuration memory region 121 is assigned. For example, configuration memory positions Reg1 through RegP can store parameters p1-p8 in accordance with the above pseudo-code, and, in particular via corresponding address pointers, can store the information specifying the data storage segments (address regions defined by indicating a corresponding start address) of data storage region 122 in which the input quantities, relevant for the relevant (currently to be calculated) neuron layer, of the input quantity vector, or intermediate input quantities of the intermediate input quantity vector, the weighting factors of the weighting matrix, and/or the offset values of the offset vector are stored.

Data storage region 122 can be provided in a main memory of the control device or in a memory assigned exclusively to model calculation unit 22. In addition, one of the configuration parameters Reg1-RegP can indicate a start address for a data storage segment for storing the respective output quantities of the resulting output quantity vector, obtained as the result of the calculation in the neuron layer. The use of address pointers has advantages because the dimensions of the model parameters of the input quantity vector and of the output quantity vector are variable.

In addition, configuration memory region 121 can provide an address position for storing an item of calculation start information RegCtrl that starts the calculation of the current neuron layer (i.e., the neuron layer assigned to the respective configuration memory segment) when a particular datum is written.

In addition, a separate status register memory region R can have one or more address positions RegR01-RegR0Q for reading items of status information. The items of status information can indicate messages reported back from the calculation of the respective neuron layer of the perceptron model. The items of status information can for example include an item of information about a computing state of model calculation unit 22 (idle/busy), a degree of progress of calculation (position of the calculation of the pseudo-code in the state machine, e.g., calculation of the input transformation, of the main loop, etc.), the validity of the parameters (incorrect address pointer, false/unsupported values (e.g., INFinity or not-a-number in float)), and the like.

In addition, unused memory addresses in each configuration memory segment A can be provided in order to take into account the block-by-block processing of configuration memory segments A by DMA unit 17.

FIG. 6a shows the configuration of a plurality of configuration memory segments A in configuration memory region 121, in which the configuration parameters are stored in successive configuration memory segments A, as shown in FIG. 6a. Here, a configuration of N configuration memory segments is specified having configuration parameters for N neuron layers MLP 1 . . . MLPN. Because the number of configuration parameters does not change for each neuron layer, configuration memory segments A are preferably provided with the same size in each case.

Some of the configuration parameters are provided as address pointers and are identified by "*". As shown in FIG. 6b, the address pointers indicate start addresses of data storage segments of data storage region 122, e.g., in the main memory of the control device, from which, for the calculation of the relevant neuron layer, the input quantities of the input quantity vector or the intermediate input quantities of the intermediate input quantity vector (e.g., MLP1_Reg1*, MLP2_Reg1*, etc.), weighting factors from the weighting matrix, and/or the offset values of the offset vector, are called. In addition, one of the address pointers points to a data storage segment for the storage of resulting output quantities of the output quantity vector or (if a neuron layer that is to be subsequently calculated is present) resulting intermediate output quantities of the intermediate output quantity vector (e.g., MLP1_Reg*, MLP2_Reg2*, etc.). Through the suitable parameterization of the configuration parameters in successive configuration memory segments A, it is preferably to be provided that the start address of data storage segment D for storing the output quantity vector of a neuron layer corresponds to the start address of the data storage segment for storing the input quantity vector or intermediate input quantity vector of a subsequent neuron layer.

The data storage segments of data storage region 122 for the input and output quantities are specified for each neuron layer with a number of address positions in data storage segments D, which specify a corresponding number of neurons of the corresponding neuron layer of the perceptron model. The start addresses of the input quantity vector and of the output quantity vector of the individual neuron layer are partitioned according to the granularity of the memory access. In this way, one or more unused data storage address regions can result, as shown as an example in FIG. 6b. The unused data storage address regions can for example occur when the address pointer can address only in page-wise fashion, e.g., in blocks of 8 or 16 bytes.

Thus, the microprocessor has only to initialize DMA unit 17 in order to calculate, in succession, the plurality of neuron layers of the perceptron model without obtaining a corresponding program sequence control through the microprocessor. The sequence controlling through successive calls of the calculation of a neuron layer takes place through DMA unit 17.

FIG. 7 shows a flow sequence diagram representing the controlling of the model calculation unit by DMA unit 17. At the beginning, a configuration is carried out by the microprocessor, in which corresponding model parameters, i.e., the values of the input quantities of the first neuron layer, are written to an associated data storage segment D of data storage region 122. Other parts of the modeling parameters, such as a plurality of configuration memory segments A, as shown in FIG. 6a, which are modeling parameters stored in respective data storage segments, such as weighting matrices and offset values separately included for each individual neuron layer, are typically provided ahead of time (off-line, during the generation phase of the MLP model). As needed, configuration memory segments A for the various neuron layers (MLP1-MLPN) can also be generated or modified during the runtime. The values of the weighting matrices and offset values for each individual neuron layer are in turn always prepared off-line (e.g., in flash). It is also possible for these parameters to be copied from flash to the respectively assigned data storage segment D in order to increase the calculation speed.

In step S1, DMA unit 17 is configured by the microcontroller for a multiple copy transfer, e.g., with incremented source addresses of the configuration memory region with the registers of processor core 18 as copy destination. As a result, DMA unit 17 learns the number of copying processes to be carried out for each configuration memory segment A, and also the number of copying processes of the overall MLP model (=number of the MLP neuron layers). Subsequently, DMA unit 17 signals to processor core 18 that it is to start the calculation, e.g., by writing calculation start information RegCtrl from configuration memory region 121 to the corresponding address position/register for processor core 18.

DMA unit 17 starts the first copy process of first configuration parameter segment A to the register of the calculating unit, and subsequently starts the calculation with the calculation of the first neuron layer in step S2 based on configuration parameters assigned to the first neuron layer (MLP1_Reg1–MLP1_RegP, RegCtrl). The address pointers of the configuration parameters indicate the data storage segments D from which the input quantities of the input quantity vector, the weighting factors from the weighting matrix, and the offset values of the offset vector are to be taken in order to calculate the output quantities of the output quantity vector of the first neuron layer.

After calculating the output quantities of the first neuron layer, this layer is in a corresponding output quantity memory block that is stored by DMA unit 17, based on the configuration parameters for the first neuron layer, in a corresponding data storage segment D of data storage region 122.

In step S3, processor core 18 of DMA unit 17 signals that the calculation of the first neuron layer is terminated. To accomplish this, processor core 18 can cause an interrupt at DMA unit 17 through corresponding configuration parameters. For the calculation of a further neuron layer, the output quantities from the calculation of the first neuron layer are assumed as intermediate input quantities for the calculation of the next neuron layer, in that DMA unit 17 hands the configuration parameters from configuration memory segments A, assigned to the further neuron layer, of configuration memory region 121 over to registers of the calculation unit, and, if warranted, stores the weighting factors of the weighting matrix, and the offset values of the offset vector, in data storage segments D indicated by the address pointers among the configuration parameters, if they were not previously stored there. Subsequently, the calculation is started in step S4.

The method of steps S3 and S4 repeats for each further neuron layer, e.g., until the initially specified number of configuration memory segments to be copied has been reached. A corresponding configuration parameter for the calculation of the last neuron layer defines the interrupt call of processor core 18, in that processor core 18 causes an interrupt directly at the microprocessor. The processor core 18 then signals a corresponding interrupt signal to the microprocessor, which thereupon calls the model value or receives it in some other way. Alternatively, model calculation unit 22 can report the interrupt signal to the DMA unit 17, and DMA unit 17 forwards the interrupt signal to the microcontroller (chained interrupts).

Configuration memory region 121 can also have configuration parameters having corresponding pointers to data storage segments D for the calculation of required data. For this purpose, after the termination of the calculation of a perceptron model, the calculation of a new first neuron layer of a second perceptron model can be carried out. For this purpose, it is necessary only that the address position to which the model value is stored as output quantity of the last neuron layer of the first perceptron model not be part of the input quantities of the first neuron layer of the second perceptron model.

What is claimed is:

1. A hardwired hardware-implemented model calculation unit for calculating a multi-layer perceptron model that defines how neurons of each of a plurality of neuron layers of a neural network operate using code that defines a set of configuration parameters to be operated upon for calculation of each of the plurality of neuron layers of the neural network, respective values of the configuration parameters being variable for the calculation of different ones of the plurality of neuron layers, the model calculation unit comprising:
  a processor core;
  a memory; and
  a Direct Memory Access (DMA) unit;
  wherein:
    the processor core is configured to calculate one or more respective output quantities of the neuron layers of the multi-layer perceptron model having a number of neurons as a function of one or more input quantities of respective input quantity vectors;
    the memory includes, for each neuron layer:
      a respective configuration memory region that, prior to the calculating of the multi-layer perception model, stores representations of the respective values of respective instances of the set of configuration parameters in a respective one of a plurality of configuration memory segments, which is uniquely assigned to the respective neuron layer, the respective configuration memory segment including a respective register for each of the configuration parameters of the set, a respective register with a first pointer to the input quantities of the respective input quantity vector of the respective neuron layer, and a respective register with a second pointer to the output quantities of the respective neuron layer; and
      a data storage region for storing in a first respective data storage segment, the input quantities of the respective input quantity vector of the respective neuron layer to which the respective first pointer of the respective neuron layer points, and for storing in a second respective data storage segment the one or more output quantities to which the respective second pointer of the respective neuron layer points; and
    the DMA unit is configured to successively instruct the processor core to calculate a respective neuron layer of the multi-layer perceptron model by executing code using the respective instance of the set of configuration parameters of the respective one of the configuration memory segments assigned to the respective neuron layer, and to calculate the input quantities defined thereby of the input quantity vector, and to store respectively resulting output quantities in a respective one of the data storage segments.

2. The model calculation unit of claim 1, wherein the second data storage region of a first one of the neuron layers is pointed to as the first data storage region of a second one of the neuron layers that immediately follows the first neuron layer.

3. The model calculation unit of claim 1, wherein the DMA unit is configured to provide to the processor core, after termination of the calculation of one of the neuron layers, the configuration parameters for a next one of the neuron layers, the calculation being terminated as a function of one or more of the configuration parameters.

4. The model calculation unit of claim 1, wherein the processor core is configured to signal an end of a current calculation of one of the neuron layers to the DMA unit or to an external location, the DMA unit subsequently starting the calculation of a next one of the neuron layers based on configuration parameters stored in a further one of the configuration memory segments.

5. The model calculation unit of claim 1, wherein the processor core is configured to calculate, for a respective one of the neuron layers of the multi-layer perceptron model, an output quantity for each neuron of the respective neuron layer as a function of one or more input quantities of an input quantity vector, a weighting matrix having weighting factors, and an offset value specified for each of the neurons of the respective layer, such that, for each of the neurons of the respective layer, the offset value assigned to the respective neuron is applied to a sum of the values of the input quantities, weighted with a weighting factor determined by the respective neuron and the input quantity to provide a result that is transformed with an activation function in order to obtain the output quantity for the respectice neuron.

6. The model calculation unit of claim 1, wherein the processor core is arranged in a surface region of an integrated module.

7. A control device comprising:
  a microprocessor; and
  one or more hardwired hardware-implemented model calculation units (a) for calculating a multi-layer perceptron model that defines how neurons of each of a plurality of neuron layers of a neural network operate using code that defines a set of configuration parameters to be operated upon for calculation of each of the plurality of neuron layers of the neural network, respective values of the configuration parameters being variable for the calculation of different ones of the plurality of neuron layers and (b) that each includes a processor core, a memory, and a Direct Memory Access (DMA) unit;
  wherein:
    the processor core is configured to calculate one or more respective output quantities of the neuron layers of the multi-layer perceptron model having a number of neurons as a function of one or more input quantities of respective input quantity vectors;
    the memory includes, for each neuron layer:
      a respective configuration memory region that, prior to the calculating of the multi-layer perception model, stores representations of the respective values of respective instances of the set of configuration parameters in a respective one of a plurality of configuration memory segments, which is uniquely assigned to the respective neuron layer, the respective configuration memory segment including a respective register for each of the configuration parameters of the set, a respective register with a first pointer to the input quantities of the respective input quantity vector of the respective neuron layer, and a respective register with a second pointer to the output quantities of the respective neuron layer; and
      a data storage region for storing in a first respective data storage segment, the input quantities of the respective input quantity vector of the respective neuron layer to which the respective first pointer of the respective neuron layer points, and for storing in a second respective data storage segment the one or more output quantities to which the respective second pointer of the respective neuron layer points; and
    the DMA unit is configured to successively instruct the processor core to calculate a respective neuron layer of the multi-layer perceptron model by executing code using the respective instance of the set of configuration parameters of the respective one of the configuration memory segments assigned to the respective neuron layer, and to calculate the input quantities defined thereby of the input quantity vector, and to store respectively resulting output quantities in a respective one of the data storage segments.

8. The control device of claim 7, wherein the control device is implemented as an integrated circuit.

9. A method of a control device that controls an engine system of a motor vehicle, wherein the control device includes (a) a microprocessor and (b) one or more hardwired hardware-implemented model calculation units (i) for calculating a multi-layer perceptron model that defines how neurons of each of a plurality of neuron layers of a neural network operate using code that defines a set of configuration parameters to be operated upon for calculation of each of the plurality of neuron layers of the neural network, respective values of the configuration parameters being variable for the calculation of different ones of the plurality of neuron layers and (ii) that each includes a processor core, a memory, and a Direct Memory Access (DMA) unit, the method comprising:

calculating, by the processor core one or more respective output quantities of the neuron layers of the multi-layer perceptron model having a number of neurons as a function of one or more input quantities of respective input quantity vectors;

for each neuron layer:
  a respective configuration memory region, prior to the calculating of the multi-layer perception model, storing representations of the respective values of respective instances of the set of configuration parameters in a respective one of a plurality of configuration memory segments, which is uniquely assigned to the respective neuron layer, the respective configuration memory segment including a respective register for each of the configuration parameters of the set, a respective register with a first pointer to the input quantities of the respective input quantity vector of the respective neuron layer, and a respective register with a second pointer to the output quantities of the respective neuron layer; and a data storage region of the memory:
  storing in a first respective data storage segment, the input quantities of the respective input quantity vector of the respective neuron layer to which the respective first pointer of the respective neuron layer points; and
  storing in a second respective data storage segment the one or more output quantities to which the respective second pointer of the respective neuron layer points; and the DMA unit successively instructing the processor core to:
  calculate a respective neuron layer of the multi-layer perceptron model by executing code using the respective instance of the set of configuration parameters of the respective one of the configuration memory segments assigned to the respective neuron layer;
  calculate the input quantities defined thereby of the input quantity vector; and
  store respectively resulting output quantities in a respective one of the data storage segments.

* * * * *